United States Patent

Lim

(10) Patent No.: US 9,454,040 B2
(45) Date of Patent: Sep. 27, 2016

(54) LIQUID CRYSTAL DISPLAY

(71) Applicant: Samsung Display Co., Ltd., Yongin, Gyeonggi-Do (KR)

(72) Inventor: Ho Lim, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 135 days.

(21) Appl. No.: 14/337,379

(22) Filed: Jul. 22, 2014

(65) Prior Publication Data

US 2015/0198846 A1    Jul. 16, 2015

(30) Foreign Application Priority Data

Jan. 10, 2014 (KR) .................. 10-2014-0003550

(51) Int. Cl.
*C09K 19/00* (2006.01)
*G02F 1/1337* (2006.01)
*G02F 1/1343* (2006.01)

(52) U.S. Cl.
CPC ... *G02F 1/133711* (2013.01); *G02F 1/133788* (2013.01); *G02F 1/134309* (2013.01); *G02F 2001/133726* (2013.01); *G02F 2001/134345* (2013.01); *Y10T 428/10* (2015.01); *Y10T 428/1005* (2015.01); *Y10T 428/1018* (2015.01)

(58) Field of Classification Search
CPC .................. G02F 1/133711; G02F 1/134309; G02F 1/133723; G02F 2001/133726; G02F 2001/133742; G02F 2001/133788; Y10T 428/10; Y10T 428/1005; Y10T 428/1018; Y10T 428/1023; C08G 73/10; C08G 73/1007; C08G 73/1025
USPC ........ 428/1.1, 1.2, 1.25, 1.26; 349/123, 127, 349/130, 187; 528/353
See application file for complete search history.

(56) References Cited

U.S. PATENT DOCUMENTS

| | | | |
|---|---|---|---|
| 6,379,758 B1 | 4/2002 | Hanmer et al. | |
| 6,676,851 B1 | 1/2004 | Buchecker et al. | |
| 8,123,977 B2 | 2/2012 | Oh et al. | |
| 2010/0033662 A1 | 2/2010 | Lee et al. | |
| 2010/0182556 A1 | 7/2010 | Oh et al. | |
| 2012/0172541 A1* | 7/2012 | Dong ............ | C09K 19/56 525/432 |
| 2012/0229744 A1 | 9/2012 | Hattori et al. | |

FOREIGN PATENT DOCUMENTS

| | | |
|---|---|---|
| JP | 2005-179589 A | 7/2005 |
| JP | 2005-187618 A | 7/2005 |
| JP | 2007-063155 A | 3/2007 |
| KR | 1020070092365 A | 9/2007 |

* cited by examiner

*Primary Examiner* — Ruiyun Zhang
(74) *Attorney, Agent, or Firm* — Cantor Colburn LLP

(57) ABSTRACT

A liquid crystal display is provided, including a first insulating substrate; a second insulating substrate facing the first insulating substrate; a pixel electrode disposed on the first insulating substrate; a common electrode disposed on the first insulating substrate or the second insulating substrate; a first alignment layer disposed on the first insulating substrate; a second alignment layer disposed on the second insulating substrate; and a liquid crystal layer disposed between the first insulating substrate and the second insulating substrate, in which at least one of the first alignment layer and the second alignment layer include a main chain and a plurality of side chains which are connected to the main chain, and at least one of the plurality of side chains includes a reactive mesogen including a vertical expression group and at least two photoreactor groups connected to the vertical expression group.

8 Claims, 11 Drawing Sheets

LIQUID CRYSTAL DISPLAY

This application claims priority to Korean Patent Application No. 10-2014-0003550 filed on Jan. 10, 2014, and all the benefits accruing therefrom under 35 U.S.C. §119, the entire contents of which are incorporated herein by reference.

BACKGROUND (1) Field

The present invention relates to a liquid crystal display.

(2) Description of the Related Art

A liquid crystal display is a flat panel display which is widely used, and includes two sheets of display panels in which field generating electrodes such as a pixel electrode and a common electrode are formed, and a liquid crystal layer is interposed therebetween. The liquid crystal display displays an image by applying a voltage to the field generating electrodes to generate an electric field in the liquid crystal layer, determining an orientation of liquid crystal molecules of the liquid crystal layer based on the generated electric field, and controlling polarization of incident light.

Among the liquid crystal displays, a liquid crystal display in a vertically aligned mode, in which major axes of the liquid crystal molecules are aligned to be perpendicular to the upper and lower display panels when an electric field is not applied to the liquid crystal layer, has a high contrast ratio and a wide reference viewing angle.

In order to implement a wide viewing angle in the liquid crystal display when in the vertically aligned mode, a plurality of domains having different alignment directions of the liquid crystals may be formed in one pixel. As a method of forming the plurality of domains, a method of forming cutouts, such as fine slits, in a field generation electrode, a method of forming protrusions on the field generating electrode, etc., are used. These methods may form the plurality of domains by aligning the liquid crystal in a direction perpendicular to a fringe field by a fringe field formed between an edge of the cutout or the protrusion and the field generating electrode facing the edge.

The liquid crystal display in the vertically aligned mode may have degraded side visibility compared to front visibility. Methods of dividing the one pixel into two subpixels and making voltages of the two subpixels different have therefore been proposed.

Meanwhile, in order to increase response speed of the liquid crystal while implementing the wide viewing angle, a method of allowing a liquid crystal to have a pretilt in a state in which the electric field is not applied has been developed.

SUMMARY

The present invention has been made in an effort to provide a display device having an alignment layer with improved mechanical properties.

An exemplary embodiment provides a liquid crystal display, including: a first insulating substrate; a second insulating substrate facing the first insulating substrate; a pixel electrode disposed on the first insulating substrate; a common electrode disposed on the first insulating substrate or the second insulating substrate; a first alignment layer disposed on the first insulating substrate; a second alignment layer disposed on the second insulating substrate; and a liquid crystal layer disposed between the first insulating substrate and the second insulating substrate, in which at least one of the first alignment layer and the second alignment layer includes a main chain and a plurality of side chains, and at least any one of the plurality of side chains includes a reactive mesogen including a vertical expression group and at least two photoreactor groups connected to the vertical expression group.

The first alignment layer and the second alignment layer include at least one compound represented by the following Chemical Formula 1 and Chemical Formula 2, wherein Y or Z is the photoreactor group.

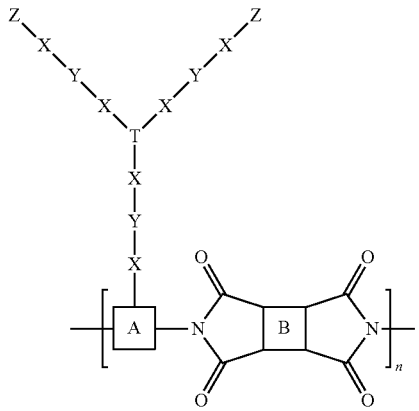

(Chemical Formula 1)

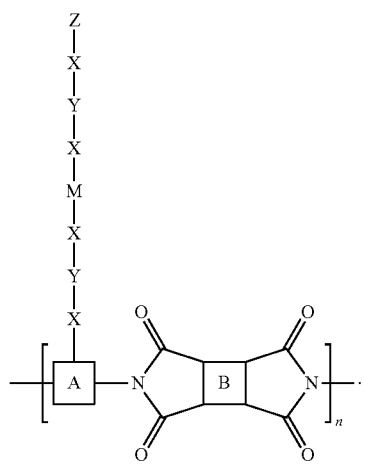

(Chemical Formula 2)

In the above Formulas 1 and 2, the A is

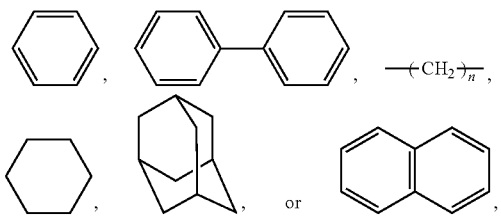

wherein n is a natural number greater than or equal to 1;

In the above Formulas 1 and 2, the B is

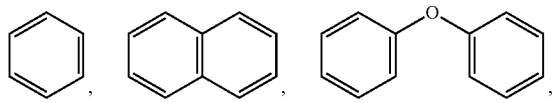

-continued

[cyclohexane], [cyclopentane], or [rectangle].

In the above Formulas 1 and 2, each X is independently selected from

—O—, —O—C(=O)—, —(CH$_2$)$_n$—, or —NH—, wherein n is a natural number greater than or equal to 1.

In the above Formulas 1 and 2, each Y is independently selected from

—(CH$_2$)$_n$—, —(CH$_2$)$_n$—C≡C—C≡C—(CH$_2$)$_n$—,

[phenylene], [biphenylene],

[terphenylene],

[cyclohexylene], [bicyclohexylene], or

[phenylene-cyclohexylene], wherein n is a natural number greater than or equal to 1.

In the above Formulas 1 and 2, the T is N,

[benzene], or [triazine].

In the above Formulas 1 and 2, the M is.

[phenyl], [naphthyl], [biphenyl],

[terphenyl],

[phenyl-cyclohexyl],

[biphenyl-cyclohexyl], or [naphthyl-cyclohexyl]

-continued

[decalin-indane fused structure].

In the above Formulas 1 and 2, each Z is independently selected from

[vinyl], [methacryloyl], [acryloyl], [alkyne], [dialkyne],

[vinyl ester], [(—CH$_2$—)$_n$ polymer], [methylene butyrolactone], wherein n is a natural number greater than or equal to 1.

At least one Y in the above Chemical Formula 2 is a

—(CH$_2$)$_n$—C≡C—C≡C—(CH$_2$)$_n$—, wherein n is a natural number greater than or equal to 1.

At least one of the first alignment layer and the second alignment layer include a diamine compound and a dianhydride compound, and the diamine compound and the dianhydride compound are present at a mole ratio of 1:1.

The common electrode is disposed on the second insulating substrate, and the pixel electrode includes a first subpixel electrode and a second subpixel electrode which include cruciform stem parts and a plurality of fine branch parts extending from the cruciform stem parts.

The pixel electrode is divided into four sub-regions by the cruciform stem parts.

The fine branch parts extend in a different direction in each of the sub-regions.

Neighboring fine branch parts are orthogonal to each other.

A width of the fine branch part is about 2.5 micrometers (μm) to about 5.0 μm.

The reactive mesogen includes a reaction initiator, and the reaction initiator is an aryl ester group.

The photoreactor group includes an acrylate group or a methacrylate group.

As set forth above, according to exemplary embodiments, it is possible to provide a display device having improved mechanical properties and afterimage of the alignment layer by using the reactive mesogen having an increased number of photoreactor groups.

DETAILED DESCRIPTION

Figure 1A:
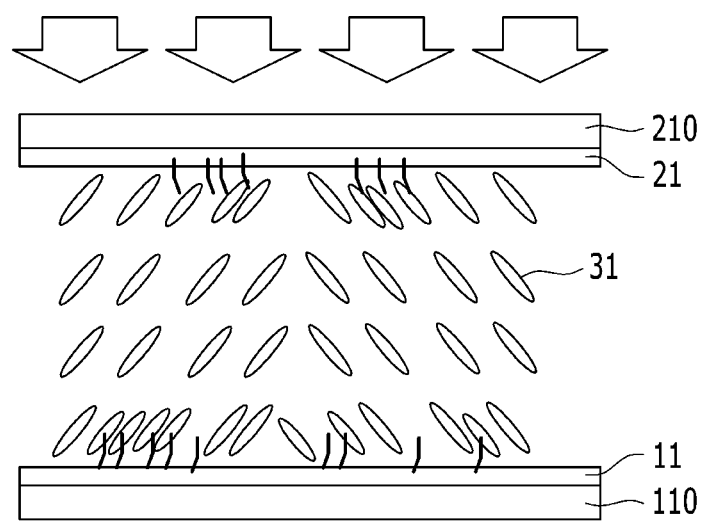
FIG. 1A is a diagram illustrating a process of allowing liquid crystal molecules to have pretilts by using an exemplary alignment layer including a photoreactor group.

The present invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In order to increase response speed of the liquid crystal while implementing the wide viewing angle, methods of allowing a liquid crystal to have a pretilt in a state in which the electric field is not applied have been developed. To allow the liquid crystals to have the pretilts in several directions, an alignment layer having several alignment directions is used, or a reactive mesogen is added to the alignment layer or the liquid crystal layer and then light is irradiated to the alignment layer or the liquid crystal layer in the state in which the electric field is applied thereto, thereby forming the pretilt.

First, a method of orienting liquid crystal molecules 31 to allow them to have a pretilt will be described with reference to FIGS. 5 to 7 along with FIGS. 1A and 1B, FIGS. 2A and 2B, and FIGS. 3A and 3B.

Figure 1B:
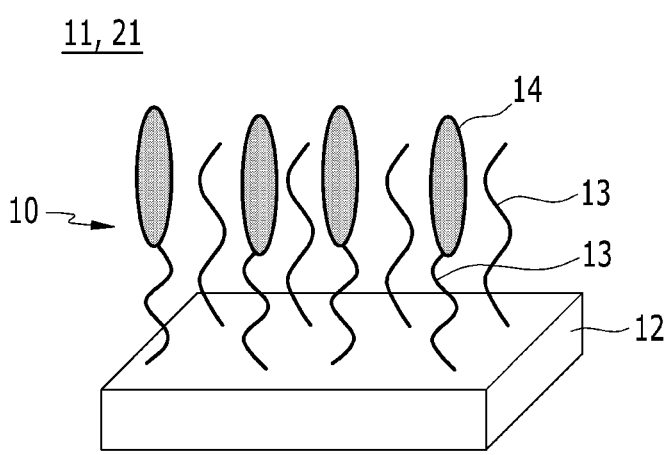
FIG. 1B is a schematic view of the exemplary alignment layer.
Figure 2A:
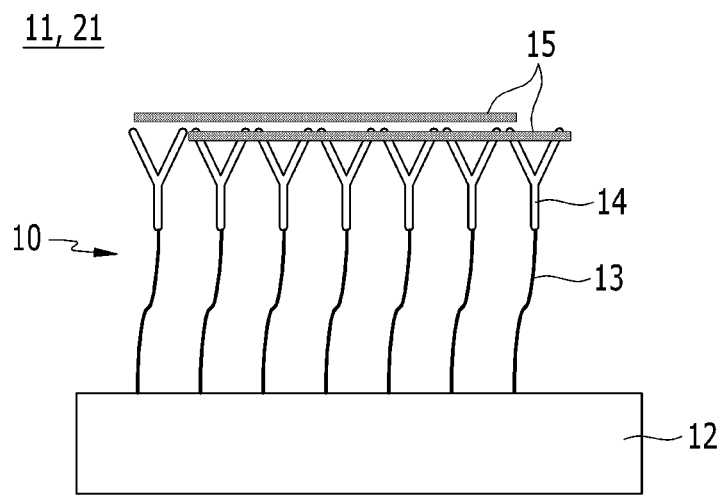
FIGS. 2A and 2B are schematic views of an exemplary alignment layer according to the present invention.
Figure 2B:
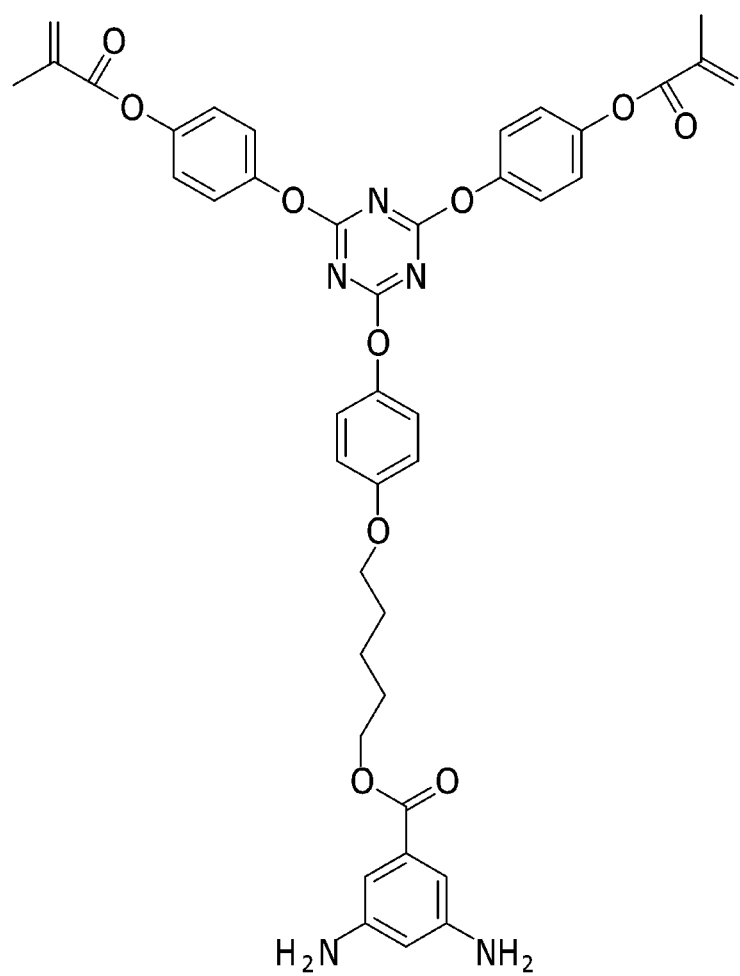
Figure 3A:
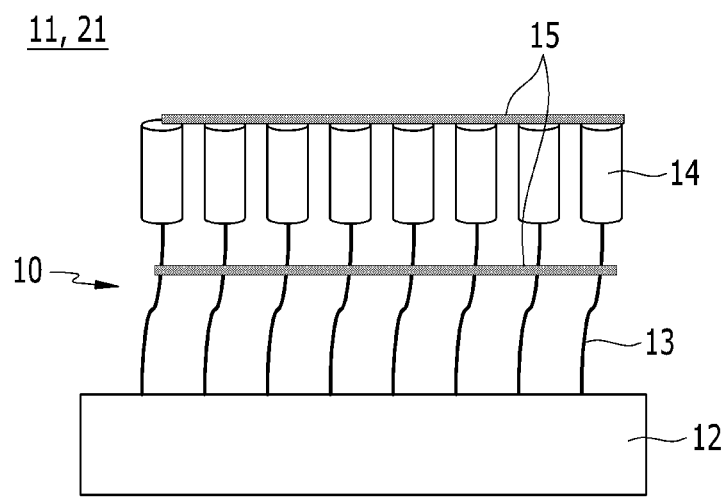
FIGS. 3A and 3B are schematic views of an exemplary embodiment of an alignment layer according to the present invention.
Figure 3B:
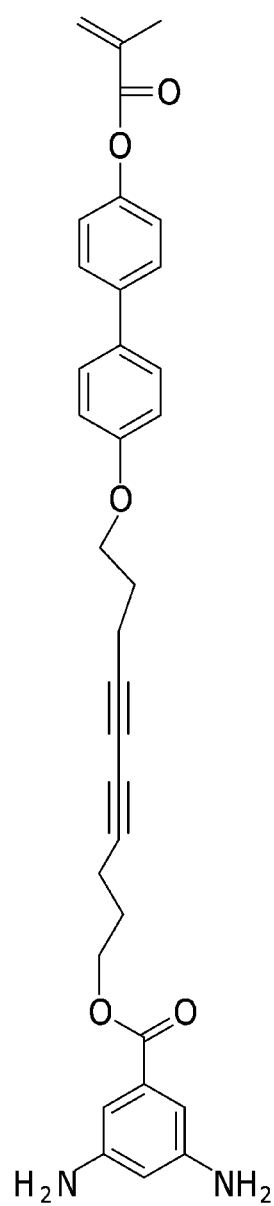

FIG. 1A is a diagram illustrating a process of allowing liquid crystal molecules to have pretilts by using an alignment layer including a photoreactor group such as with ultraviolet rays, and FIG. 1B is a view illustrating an exemplary embodiment of a structure of the alignment layer. FIGS. 2A and 3A are schematic views of a reactive mesogen, and FIG. 2B shows an example of Chemical Formula 1. FIG. 3B is an example of Chemical Formula 2 in which —X—Y— of the -M-X—Y—X—Z— portion of the structure is not present.

In FIGS. 1A and 1B, alignment layers 11 and 21 including alignment materials, are formed on two substrates 110 and 210, respectively.

The alignment layers 11 and 21 include a compound including a main chain 12 including a dianhydride and a diamine, and a plurality of side chains which are connected to the main chain 12. The plurality of side chains may each include a reactive mesogen 10 having at least two photoreactor groups 14, a vertical expression group 13, and the like.

Figure 6:
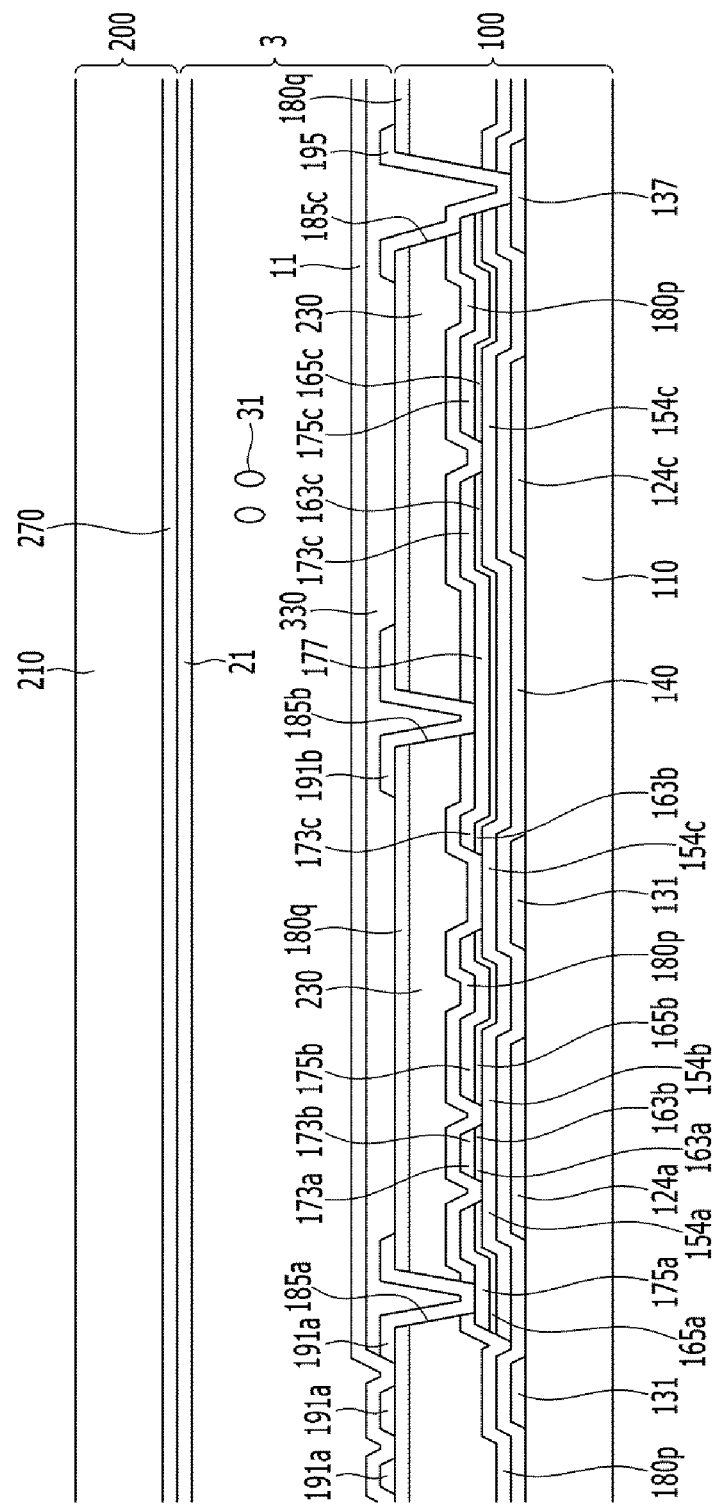
FIG. 6 is a cross-sectional view of the liquid crystal display taken along the line V-V of FIG. 5.

With reference to FIG. 6, a data voltage is applied to a first subpixel electrode 191a and a second subpixel electrode 191b, and a common voltage is applied to a common electrode 270 of an upper display panel 200 to generate an electric field in a liquid crystal layer 3 between display panel 100 and upper display panel 200. Next, with reference to FIG. 7, the liquid crystal molecules 31 of the liquid crystal layer 3 may be tilted in directions parallel with length directions of fine branch parts 194a, 194b, 194c, and 194d in response to the electric field. In this case, a direction in which the liquid crystal molecules 31 are tilted in one pixel may be a total of four directions.

When the electric field is generated in the liquid crystal layer 3 and then light, such as ultraviolet light, is irradiated thereto, photoreactor groups 14 included in the reactive mesogen react with each other to form a cross-linking portion 15 as illustrated in FIG. 2A. The cross-linking portion 15 may have a pretilt.

The reactive mesogen 10 included in the alignment layers 11 and 21 includes the vertical expression group 13 which is connected to the main chain 12 and the photoreactor group 14 which is connected to the vertical expression group 13. According to another exemplary embodiment, the photoreactor group 14 may also be directly connected to the main chain 12.

The reactive mesogen has a pretilt and thus when a voltage is applied to field generating electrodes 191 and 270, the liquid crystal molecules 31 may be oriented with the pretilt.

A reaction initiator of a prepolymer may be an aryl ester group. In an exemplary embodiment, the photoreactor group 14 may be an acrylate group or a methacrylate group, but is not limited thereto.

According to an exemplary embodiment, the reactive mesogen may include the vertical expression group 13 and at least two photoreactor groups 14, in which the at least two photoreactor groups 14 may be cross-linked by light irradiation to form at least two cross-linking portions 15, such that mechanical properties of the alignment layers 11 and 21 may be improved.

Hereinafter, an exemplary embodiment of the alignment layers 11 and 21 will be described in more detail with reference to FIGS. 2A and 2B and FIGS. 3A and 3B.

In an exemplary embodiment, the alignment layers 11 and 21 include a compound including the main chain 12 and the plurality of side chains which are connected to the main chain 12.

The main chain 12 may include a dianhydride, a diamine, and the like.

In an exemplary embodiment, the plurality of side chains includes the reactive mesogen 10 which includes the vertical expression group 13 connected to the main chain 12 and the photoreactor group 14 connected to the vertical expression group 13. In another exemplary embodiment, some of the plurality of side chains may include only the vertical expression group 13, and the remaining plurality of side chains may be the reactive mesogen 10 which includes the at least two photoreactor groups 14 connected to the vertical expression group 13.

FIGS. 2A to 3A illustrate only the reactive mesogen 10 which includes the vertical expression group 13 and the at least two photoreactor groups 14 connected thereto.

The at least two photoreactor groups 14 which are included in the reactive mesogen 10 may be connected to one side of the vertical expression group 13 in a "Y" shape, or may be connected to both sides thereof in an "I" shape, and a connection method thereof is not limited.

In detail, as illustrated in FIG. 2A, the reactive mesogen 10 includes the two photoreactor groups 14 which are located at an end of the reactive mesogen 10, or as illustrated in FIG. 3A, may include the two photoreactor groups 14 which are located in a length direction of the reactive mesogen.

When the photoreactor groups are arranged as illustrated in FIG. 2A, the plurality of cross-linking portions 15 may be formed in parallel with each other, and when the photoreactor groups 14 are arranged as illustrated in FIG. 3A, the plurality of cross-linking portions 15 may be separately located from each other.

The alignment layers 11 and 21 including the reactive mesogen may include at least one compounds represented by the following Chemical Formulas 1 and 2, and the side chain other than the main chain represents the vertical expression group 13 and the photoreactor group 14 which is connected to the vertical expression group 13.

Chemical Formula 1

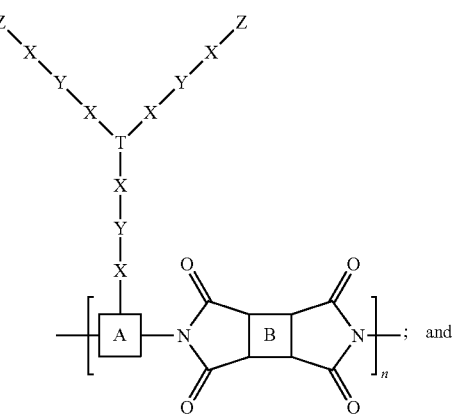

Chemical Formula 2

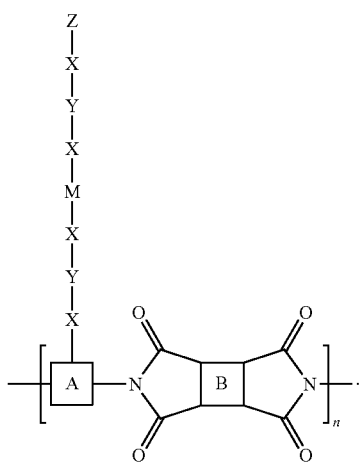

In the above Chemical Formulas 1 and 2, A may be

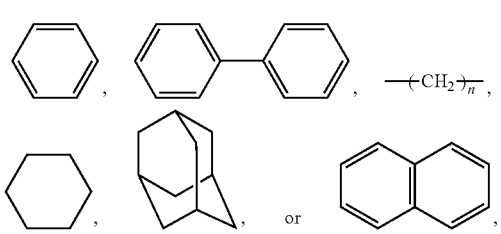

wherein n is a natural number greater than or equal to 1; B may be

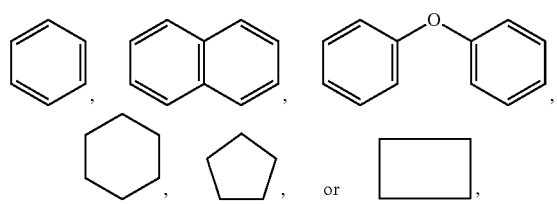

each X may be independently selected from

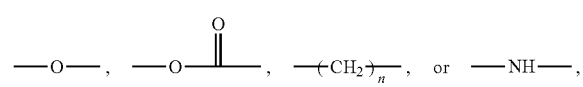

each Y may be independently selected from

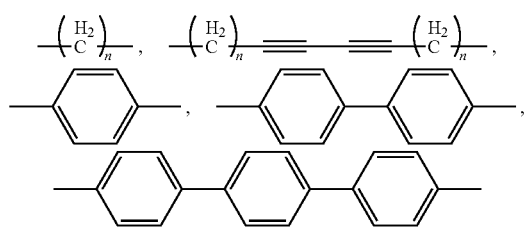

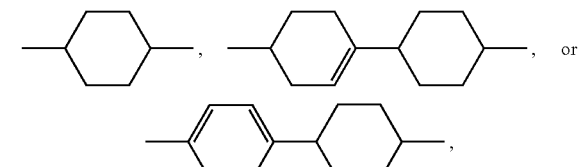

wherein n is a natural number greater than or equal to 1; T may independently be N,

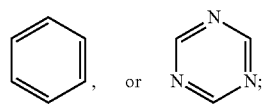 [SMILES: c1ccccc1 ; c1ncncn1]

M may independently be

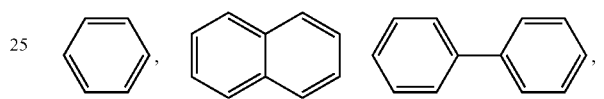

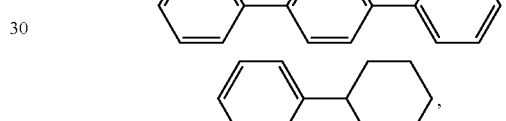

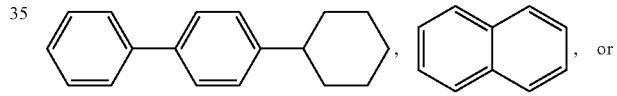

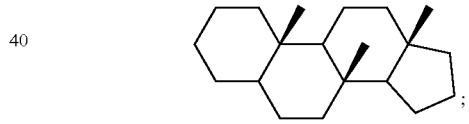

and each Z may be independently selected from

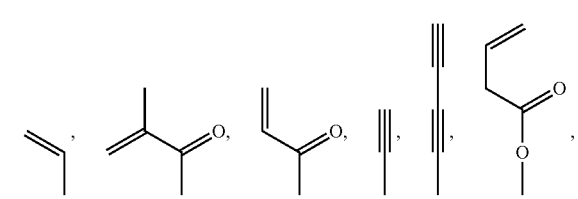

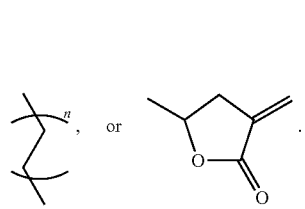

In an exemplary embodiment, in the compound which is expressed by the above Chemical Formula 2, at least one Y included in the side chain may be

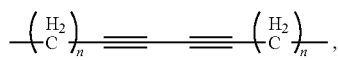

wherein n is a natural number greater than or equal to 1. In the compound expressed by the above Chemical Formula 2, the photoreactor group may be disposed in parallel with the vertical expression group.

In the above Chemical Formulas 1 and 2, the Y to Z included in the reactive mesogen may be the photoreactor group. That is, in the case where Y or the Z includes an unsaturated bond over a double bond, the photoreaction may occur.

By the above combination, Chemical Formula 1 may be the compound as illustrated in FIG. 2B and an example of Chemical Formula 2 may be the compound as illustrated in FIG. 3B, in which —X—Y— of the -M-X—Y—X—Z— portion of Chemical Formula 2 is not present. However, any combination of the foregoing compounds may also be made, and is not limited to those illustrated in FIGS. 2B to 3B.

Further, while the present invention only describes embodiments in which one reactive mesogen includes two photoreactor groups, the invention is not limited thereto, and may include embodiments in which the one reactive mesogen includes at least two photoreactor groups.

As an example of a reactive mesogen including Chemical Formula 1, the compound of FIG. 2B may be included in the alignment layer by the following process shown in Chemical Reaction 1:

(Chemical Reaction 1).

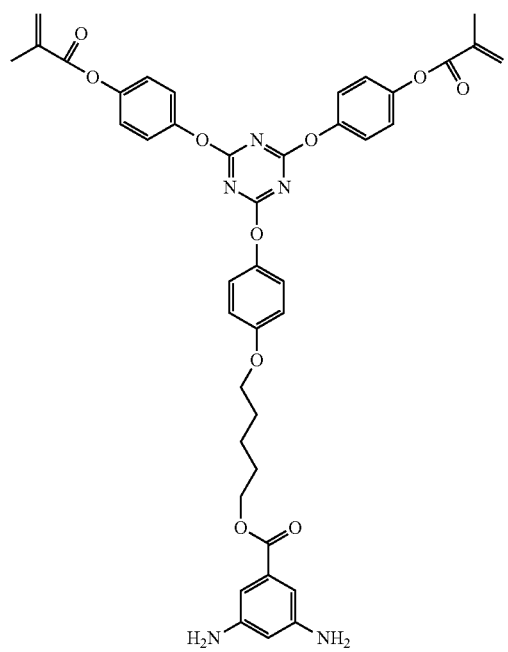

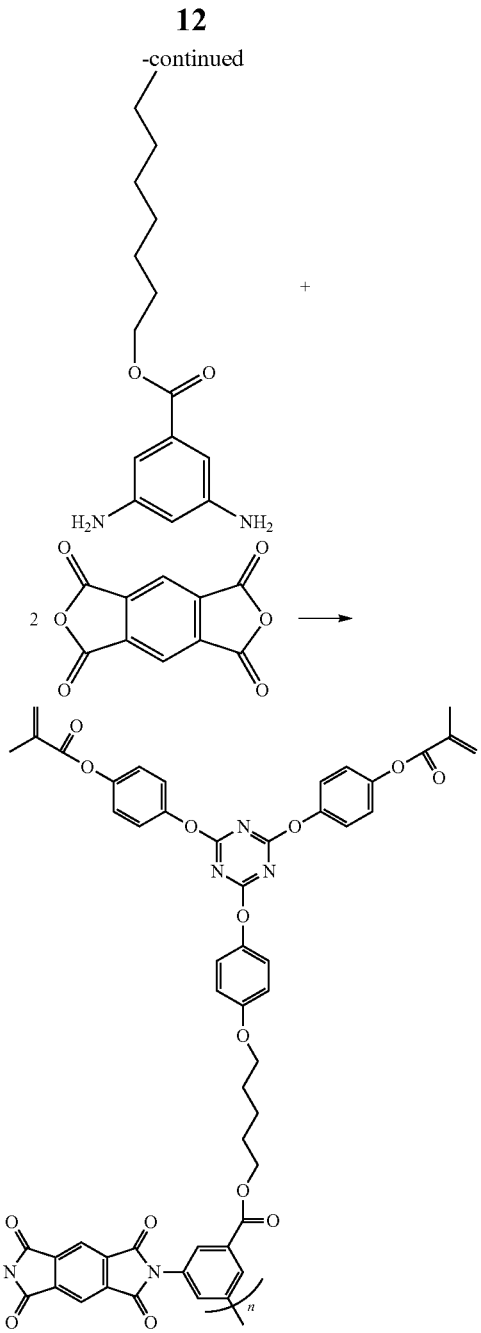

As shown in Chemical Reaction 1, the alignment layer may be formed by co-polymerizing the reactive mesogen including the photoreactor groups 14, a monomer including the vertical expression group 13 and a diamine compound, and a dianhydride compound. In this case, a mole ratio of the diamine compound and the dianhydride compound may be 1:1.

The compound of FIG. 3B, which is an example of the above Chemical Formula 2 in which —X—Y— of the -M-X—Y—X—Z— portion of Chemical Formula 2 is not present, is not described herein based on a separate schematized chemical reaction formula, but may be derived by substituting the reactive mesogen 10 represented by the above Chemical Formula 2 (illustrated in FIG. 3B) for the reactive mesogen 10 represented by the above Chemical Formula 1 (illustrated FIG. 2B) in the above process.

Figure 4:
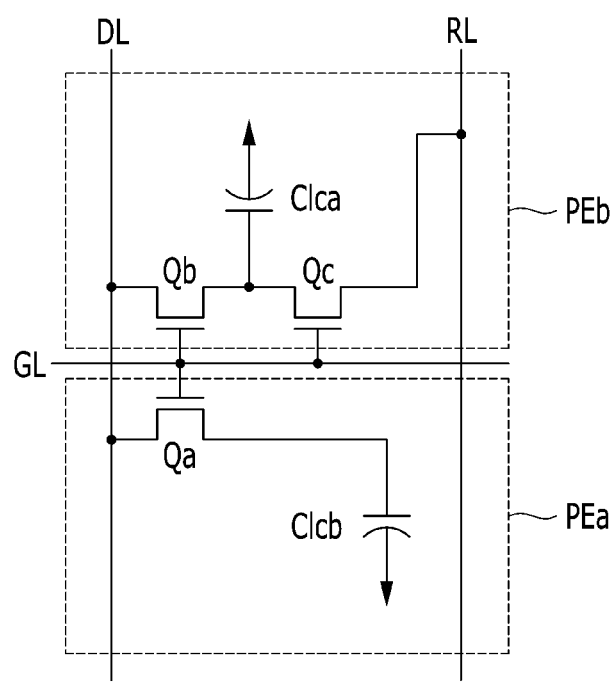
FIG. 4 is a circuit diagram of one pixel of an exemplary embodiment of a liquid crystal display according to the present invention.

An exemplary embodiment of an arrangement of signal lines and pixels of a liquid crystal display and a driving method thereof will be described with reference to FIG. 4. FIG. 4 is an equivalent circuit diagram of one pixel of an exemplary liquid crystal display.

Referring to FIG. 4, one pixel PX of the exemplary liquid crystal display includes a plurality of signal lines which includes a gate line GL transferring a gate signal, a data line DL transferring a data signal, and a voltage dividing reference voltage line RL which transfers a voltage dividing reference voltage, first, second, and third switching elements Qa, Qb, and Qc, respectively, which are connected to the plurality of signal lines, and first and second liquid crystal capacitors Clca and Clcb.

The first and second switching elements Qa and Qb are each connected to the gate line GL and the data line DL, and the third switching element Qc is connected to an output terminal of the second switching element Qb and the voltage dividing reference voltage line RL.

The first and second switching elements Qa and Qb are each a three-terminal element, such as a thin film transistor ("TFT"), and control terminals thereof are connected to the gate line GL and input terminals thereof are connected to the data line DL. An output terminal of the first switching element Qa is connected to the first liquid crystal capacitor Clca, and an output terminal of the second switching element Qb is connected to input terminals of the second liquid crystal capacitor Clcb and the third switching element Qc.

The third switching element Qc is also a three-terminal element, such as a thin film transistor, and a control terminal thereof is connected to the gate line GL, an input terminal thereof is connected to the second liquid crystal capacitor Clcb, and an output terminal thereof is connected to the voltage dividing reference voltage line RL.

When a gate-on signal is applied to the gate line GL, the first, second, and third switching elements Qa, Qb, and Qc, respectively, which are connected to the gate line GL are turned on. Therefore, a data voltage applied to the data line DL is applied to a first sub-pixel electrode PEa and a second sub-pixel electrode PEb through the first and second switching elements Qa and Qb which are turned on. In this case, the data voltage applied to the first sub-pixel electrode PEa and to the second sub-pixel electrode PEb are the same, and the first and second liquid crystal capacitors Clca and Clcb are charged with the same value as a difference between a common voltage and the data voltage. At the same time, a voltage charged in the second liquid crystal capacitor Clcb is divided by the third switching element Qc which is turned on. As a result, a voltage value which is charged in the second liquid crystal capacitor Clcb is lowered by a difference between the common voltage and the voltage division reference voltage. That is, the voltage which is charged in the first liquid crystal capacitor Clca is higher than the voltage which is charged in the second liquid crystal capacitor Clcb.

As such, the voltage which is charged in the first liquid crystal capacitor Clca and the voltage which is charged in the second liquid crystal capacitor Clcb are different from each other. Since the voltage of the first liquid crystal capacitor Clca and the voltage of the second liquid crystal capacitor Clcb are different from each other, inclined angles of liquid crystal molecules in the first subpixel and the second subpixel are different from each other, and thus the luminance of the first subpixel and the luminance of the second subpixel are different from each other. Therefore, when the voltage of the first liquid crystal capacitor Clca and the voltage of the second liquid crystal capacitor Clcb are appropriately controlled, an image viewed from a side may maximally approach an image viewed from a front, thereby improving side visibility.

In an exemplary embodiment, in order to make the voltage charged in the first liquid crystal capacitor Clca and the voltage charged in the second liquid crystal capacitor Clcb different, the second liquid crystal capacitor Clcb and the third switching element Qc are connected to the voltage division reference voltage line RL. In another exemplary embodiment, the second liquid crystal capacitor Clcb may also be connected to a step-down capacitor.

In detail, the liquid crystal display includes the third switching element which includes a first terminal connected to a step-down gate line, a second terminal connected to the second liquid crystal capacitor Clcb, and a third terminal connected to the step-down capacitor to charge a portion of an amount of electric charge charged in the second liquid crystal capacitor Clcb in the step-down capacitor, thereby making the charging voltage between the first liquid crystal capacitor Clca and the second liquid crystal capacitor Clcb different. Further, in the case of the exemplary liquid crystal display, the first and second liquid crystal capacitors Clca and Clcb are connected to different data lines to be applied with different data voltages, thereby allowing the charging voltage between the first and second liquid crystal capacitors Clca and Clcb to be differently set. In addition, the charging voltage between the first and second liquid crystal capacitors Clca and Clcb may be differently set by several other methods.

An exemplary embodiment of a structure of the liquid crystal display will be described in detail with reference to FIGS. 5 and 7. FIG. 5 is a plan view of an example of one pixel of the exemplary liquid crystal display, and FIG. 6 is a cross-sectional view of the liquid crystal display taken along the line V-V of FIG. 5. FIG. 7 is a plan view illustrating a basic structure of the pixel electrode of the exemplary liquid crystal display.

Figure 5:
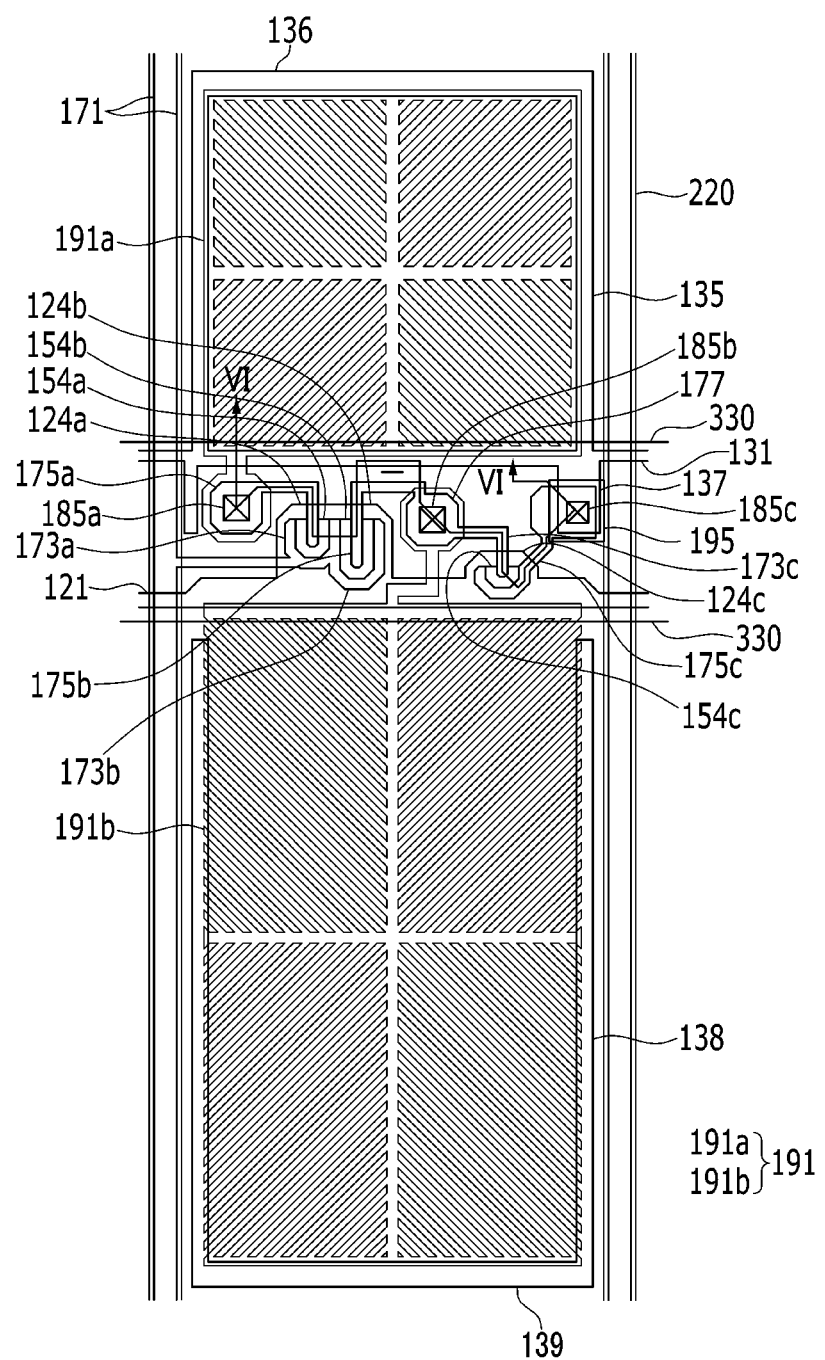
FIG. 5 is an illustration of a plan view of one pixel in an exemplary liquid crystal display according to the present invention.

Referring to FIGS. 5 and 6, an exemplary embodiment of the liquid crystal display includes a lower display panel 100 and an upper display panel 200 facing each other, a liquid crystal layer 3 interposed between the two display panels 100 and 200, and a pair of polarizers (not illustrated) attached outside the display panels 100 and 200.

First, the lower panel 100 will be described.

A gate conductor which includes a gate line 121 and a voltage division reference voltage line 131 is formed on an insulating substrate 110 made of transparent glass, plastic, or the like.

The gate line 121 includes a wide end (not illustrated) for connection with a first gate electrode 124a, a second gate electrode 124b, a third gate electrode 124c, and another layer or an external driving circuit.

The voltage division reference voltage line 131 includes first storage electrodes 135 and 136 and a reference electrode 137. Second storage electrodes 138 and 139 are disposed overlapping a second sub-pixel electrode 191b, but are not connected to the voltage dividing reference voltage line 131.

A gate insulating layer 140 is formed on the gate line 121 and the voltage dividing reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A plurality of data lines 171 including a first source electrode 173a and a second source electrode 173b and a data conductor including a first drain electrode 175a, a second drain electrode 175b, a third source electrode 173c, and a third drain electrode 175c are formed on the ohmic contacts 163a, 165a, 163b, 165b, 163c, and 165c and the gate insulating layer 140.

The data conductor, the semiconductor disposed beneath the data conductor, and the ohmic contact may be simultaneously formed using a single mask.

The data line 171 includes a wide end (not illustrated) for connection with another layer or an external driving circuit.

The first gate electrode 124a, the first source electrode 173a, and the first drain electrode 175a form a first thin film transistor ("TFT") Qa along with the first semiconductor 154a, and a channel of the first thin film transistor is formed on the first semiconductor 154a between the first source electrode 173a and the first drain electrode 175a. Similarly, the second gate electrode 124b, the second source electrode 173b, and the second drain electrode 175b form one second thin film transistor Qb along with the second semiconductor 154b, and a channel is formed on the second semiconductor 154b between the second source electrode 173b and the second drain electrode 175b. And, the third gate electrode 124c, the third source electrode 173c, and the third drain electrode 175c form one third thin film transistor Qc along with the third semiconductor 154c, and the channel is formed on the third semiconductor 154c between the third source electrode 173c and the third drain electrode 175c.

The second drain electrode 175b is connected to the third source electrode 173c and includes a wide expansion 177.

A first passivation layer 180p is formed on the data conductors 171, 173c, 175a, 175b, and 175c and the exposed semiconductors 154a, 154b, and 154c. The first passivation layer 180p may include an inorganic insulating layer made of silicon nitride, silicon oxide, or the like. The first passivation layer 180p may prevent a pigment of a color filter 230 from flowing into the exposed semiconductors 154a, 154b, and 154c.

The color filter 230 is formed on the first passivation layer 180p. The color filter 230 extends in a vertical direction along two data lines which are adjacent to each other. A first light blocking member 220 is disposed on the first passivation layer 180p, the edge of the color filter 230, and the data line 171.

The first light blocking member 220 extends along the data line 171 and is disposed between two adjacent color filters 230. The width of the first light blocking member 220 may be greater than that of the data line 171. As such, because the width of the first light blocking member 220 is formed to be greater than that of the data line 171, the first light blocking member 220 may prevent the incident light from the outside from reflecting off a surface of the data line 171 which is made of metal. Light reflected from the surface of the data line 171 interferes with the light transmitting through the liquid crystal layer 3 and is unable to prevent a contrast ratio of the liquid crystal display from deteriorating.

A second passivation layer 180q is formed on the color filter 220 and the first light blocking member 230.

The second passivation layer 180q may include an inorganic insulating layer made of a silicon nitride, a silicon oxide, or the like. The second passivation layer 180q prevents the color filter 230 from lifting and suppresses pollution of the liquid crystal layer 3 due to organic materials such as a solvent inflowing from the color filter 230, thereby preventing defects, such as an afterimage which may occur at the time of driving the screen, from occurring.

A first contact hole 185a and a second contact hole 185b, which expose the first drain electrode 175a and the second drain electrode 175b, respectively, are formed on the first passivation layer 180p and the second passivation layer 180q.

A third contact hole 185c, which exposes a portion of the reference electrode 137 and a portion of the third drain electrode 175c, is formed on the first passivation layer 180p and the second passivation layer 180q, and the gate insulating layer 140, in which the third contact hole 185c is formed, is covered with a connection member 195. The connection member 195 electrically connects between the reference electrode 137 and the third drain electrode 175c which are exposed through the third contact hole 185c.

A plurality of pixel electrodes 191 are formed on the second passivation layer 180q. The pixel electrodes 191 are separated from each other, having the gate line disposed therebetween, and each includes the first sub-pixel electrode 191a and the second sub-pixel electrode 191b which are adjacent to each other in a column direction based on the gate line 121. The pixel electrode 191 may be made of a transparent conductive material such as indium tin oxide ("ITO") and indium zinc oxide ("IZO"). The pixel electrode 191 may also be made of a reflective metal such as aluminum, silver, chromium, or alloys thereof.

Figure 7:
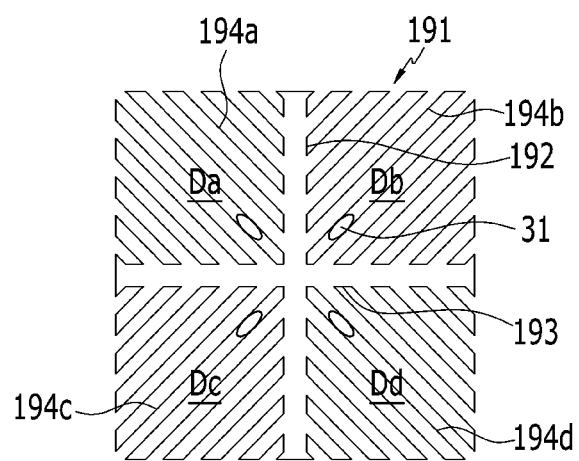
FIG. 7 is a diagram illustrating a basic structure of the pixel illustrated in FIG. 5.

The first sub-pixel electrode 191a and the second sub-pixel electrode 191b each include a basic electrode 191 as illustrated in FIG. 7 or at least one variant thereof.

The first sub-pixel electrode 191a and the second sub-pixel electrode 191b are physically and electrically connected to the first drain electrode 175a and the second drain electrode 175b through the first and second contact holes 185a and 185b, respectively, and are applied with a data voltage from the first drain electrode 175a and the second drain electrode 175b. In this case, some of the data voltage applied to the second drain electrode 175b is divided by the third source electrode 173c such that a magnitude of the voltage applied to the first sub-pixel electrode 191a may be larger than that of the voltage applied to the second sub-pixel electrode 191b.

The first sub-pixel electrode 191a and the second sub-pixel electrode 191b to which the data voltage is applied generate an electric field along with the common electrode 270 of the upper display panel 200, thereby determining alignment of liquid crystal molecules of the liquid crystal layer 3 between the two electrodes 191 and 270. The luminance of light passing through the liquid crystal layer 3 along the alignment direction of the liquid crystal molecules determined as described above is changed.

A second light blocking member 330 is disposed on the pixel electrode 191. The second light blocking member 330 is formed to cover a region in which the first thin film transistor Qa, the second thin film transistor Qb, the third thin film transistor Qc, and the first to third contact holes 185a, 185b, and 185c are disposed, and extends in the same direction as the gate line 121 to overlap a portion of the data line 171. The second light blocking member 330 is disposed to at least partially overlap the two data lines 171 which are disposed at both sides of one pixel region to be able to prevent light from leaking which may occur around the data line 171 and the gate line 121 and prevent light from leaking at a region in which the first thin film transistor Qa, the second thin film transistor Qb, and the third thin film transistor Qc are disposed.

Prior to forming the second light blocking member 330, the first passivation layer 180p, the color filter 230, and the second passivation layer 180q are disposed in the region in which the first thin film transistor Qa, the second thin film transistor Qb, the third thin film transistor Qc, and the first to third contact holes 185a, 185b, and 185c are disposed, thereby easily identifying the positions of the first thin film transistor Qa, the second thin film transistor Qb, the third thin film transistor Qc, and the first to third contact holes 185a, 185b, and 185c.

The first alignment layer 11 is disposed on the second light blocking member 330. As described above, the first alignment layer 11 includes the reactive mesogen 10 including at least two photoreactor groups 14 and may be expressed by the chemical formula illustrated in FIG. 2B or 3B by way of example. The mechanical properties may be improved by the alignment layer.

Next, the upper panel 200 will be described.

The common electrode 270 is formed on the insulating substrate 210. The second alignment layer 21 is formed on the common electrode 270 (see for example FIG. 1A). The second alignment layer 21 may be a vertical alignment layer, and may be made of the same material as the foregoing first alignment layer 11.

The liquid crystal layer 3 has negative dielectric anisotropy, and the liquid crystal molecules of the liquid crystal layer 3 are aligned so that a major axis thereof is perpendicular to the surfaces of the two display panels 100 and 200 in the state in which no electric field is present.

Next, the basic electrode 191 will be described with reference to FIG. 7.

As illustrated in FIG. 7, the overall shape of the basic electrode 191 is a quadrangle, and includes a cruciform stem part which is configured to include a horizontal stem part 193 and a vertical stem part 192 orthogonal thereto. Further, the basic electrode 191 is divided into a first sub-region Da, a second sub-region Db, a third sub-region Dc, and a fourth sub-region Dd by the horizontal stem part 193 and the vertical stem part 192, in which each sub-region Da to Dd includes a plurality of first fine branch parts 194a, a plurality of second fine branch parts 194b, a plurality of third fine branch parts 194c, and a plurality of fourth fine branch parts 194d.

The first fine branch part 194a obliquely extends to the left and up from the horizontal stem part 193 or the vertical stem part 192, and the second fine branch part 194b obliquely extends to the right and up from the horizontal stem part 193 or the vertical stem part 192. Further, the third fine branch part 194c extends to the left and down from the horizontal stem part 193 or the vertical stem part 192, and the fourth fine branch part 194d obliquely extends to the right and down from the horizontal stem part 193 or the vertical stem part 192.

The first to fourth fine branch parts 194a, 194b, 194c, and 194d form an angle of approximately 45° or 135° with respect to the gate line 121 or the horizontal stem part 193. Further, the fine branch parts 194a, 194b, 194c, and 194d of two neighboring sub-regions of Da, Db, Dc, and Dd may be orthogonal to each other.

Widths of the fine branch parts 194a, 194b, 194c, and 194d may be about 2.5 μm to about 5.0 μm, and an interval between the adjacent fine branch parts 194a, 194b, 194c, and 194d within one sub-region Da, Db, Dc, and Dd may be about 2.5 μm to about 5.0 μm.

In an exemplary embodiment, the widths of the fine branch parts 194a, 194b, 194c, and 194d may be widened toward the horizontal stem part 193 or the vertical stem part 192, and a difference between a portion having the widest width and a portion having the narrowest width in one of the fine branch parts 194a, 194b, 194c, and 194d may be about 0.2 μm to about 1.5 μm.

The first sub-pixel electrode 191a and the second sub-pixel electrode 191b are connected to the first drain electrode 175a or the second drain electrode 175b, respectively, through the first and second contact holes 185a and 186b, and are applied with a data voltage from the first drain electrode 175a and the second drain electrode 175b. In this case, sides of the first to fourth fine branch parts 194a, 194b, 194c, and 194d distort an electric field to generate a horizontal component which determines an inclined direction of the liquid crystal molecules 31. The horizontal component of the electric field is substantially horizontal with respect to the sides of the first to fourth fine branch parts 194a, 194b, 194c, and 194d.

As illustrated in FIG. 7, the liquid crystal molecules 31 are therefore inclined in a direction parallel with a length direction of the fine branch parts 194a, 194b, 194c, and 194d. The one pixel electrode 191 includes the four sub-regions Da, Db, Dc, and Dd in which the length directions of the fine branch parts 194a, 194b, 194c, and 194d are different from each other, and therefore the direction in which the liquid crystal molecules 31 are inclined is approximately four directions and the liquid crystal layer 3 is formed with four domains in which the alignment direction of the liquid crystal molecules 31 are different on the liquid crystal layer 3. When the direction in which the liquid crystal molecules are inclined is various, the reference viewing angle of the liquid crystal display is increased.

Next, an instantaneous afterimage of an exemplary embodiment of the liquid crystal display will be described with reference to FIG. 8

Figure 8:
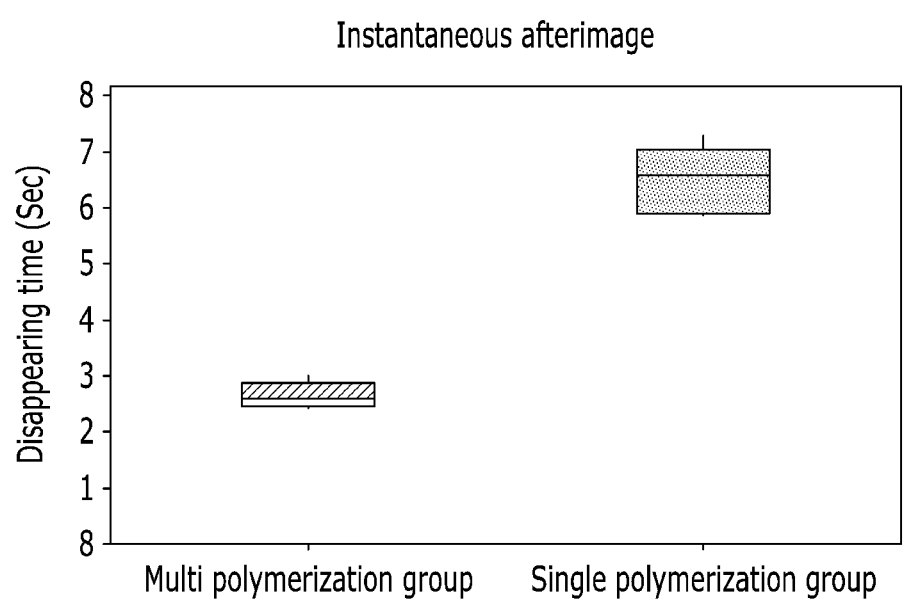
FIG. 8 is a graph of the instantaneous afterimage of the exemplary liquid display device versus the disappearing time (seconds).

FIG. 8 is a graph showing the instantaneous afterimage versus disappearing time in seconds (sec) for a multipolymerization group and a single polymerization group. An exemplary embodiment including the plurality of photoreactor groups is represented by a multiple polymerization group, and a comparative example including a single photoreactor group is represented by a single polymerization group.

It was confirmed from the evaluation result of the instantaneous afterimage that a liquid crystal display including the exemplary plurality of photoreactor groups (multi polymerization group), the afterimage disappears after about 3 seconds, whereas a liquid crystal display including the comparative single photoreactor group (single polymerization group), the afterimage disappears after about 7 to 8 seconds.

Therefore, it was confirmed that the exemplary alignment layer including the plurality of photoreactor groups has improved mechanical properties, and the liquid crystal display including the exemplary alignment layer has an improved afterimage.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first insulating substrate;
a second insulating substrate facing the first insulating substrate;
a pixel electrode disposed on the first insulating substrate;

a common electrode disposed on the first insulating substrate or the second insulating substrate;
a first alignment layer disposed on the first insulating substrate;
a second alignment layer disposed on the second insulating substrate; and
a liquid crystal layer disposed between the first insulating substrate and the second insulating substrate,
wherein
at least one of the first alignment layer and the second alignment layer comprises
at least one compound represented by Chemical Formula 1 and Chemical Formula 2:

Chemical Formula 1

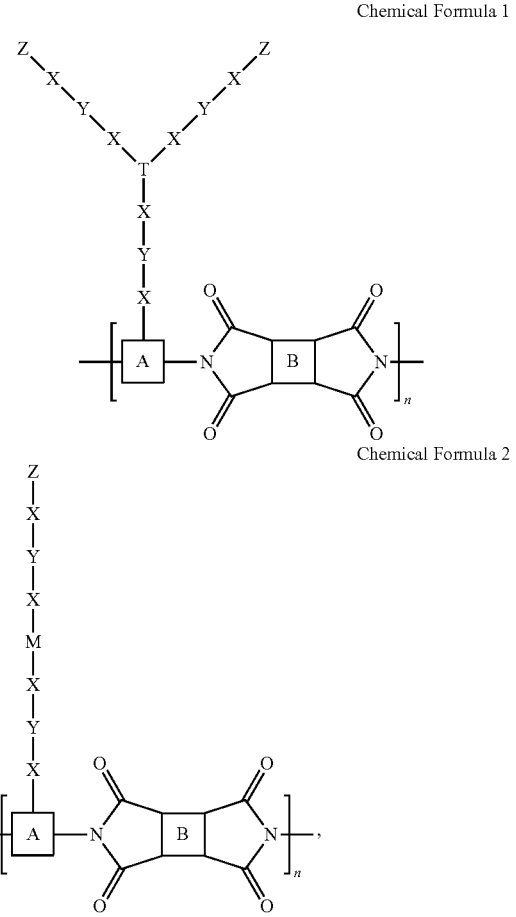

Chemical Formula 2

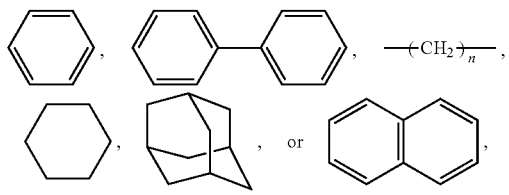

wherein in Chemical Formulas 1 and 2,
n is a natural number greater than or equal to 1
A is

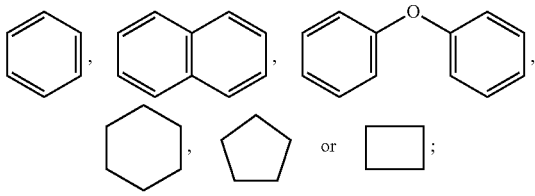

wherein n is a natural number greater than or equal to 1;
B is

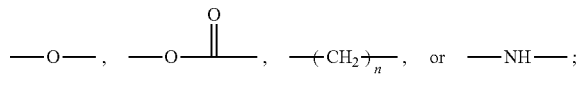

each X is independently selected from $-O-$, $-O-\overset{O}{\underset{}{C}}-$, $-(CH_2)_n-$, or $-NH-$;

each Y is independently selected from

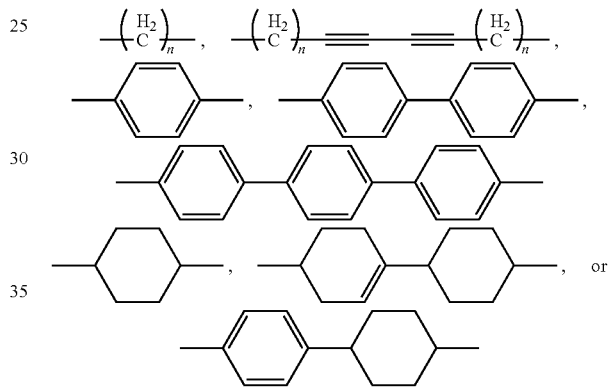

wherein n is a natural number greater than or equal to 1;
T is N,

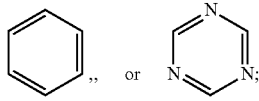 [SMILES: c1ccccc1 ; c1ncncn1]

M is

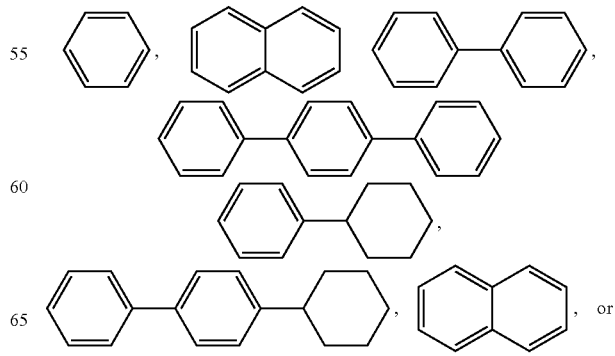

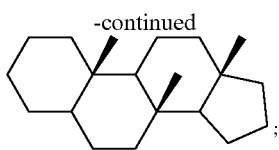

and
each Z is independently selected from

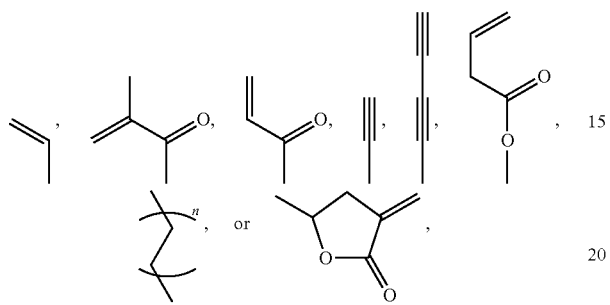

wherein n is a natural number greater than or equal to 1.

2. The liquid crystal display of claim 1, wherein at least one Y in Chemical Formula 2 is a

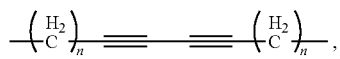

wherein n is a natural number greater than or equal to 1.

3. The liquid crystal display of claim 1, wherein
at least one of the first alignment layer and the second alignment layer comprise a diamine compound and a dianhydride compound, and
the diamine compound and the dianhydride compound are present at a mole ratio of 1:1.

4. The liquid crystal display of claim 1, wherein
the common electrode is disposed on the second insulating substrate, and
the pixel electrode comprises a first subpixel electrode and a second subpixel electrode respectively comprising cruciform stem parts, and a plurality of fine branch parts extending from the cruciform stem parts.

5. The liquid crystal display of claim 4, wherein
the pixel electrode is divided into four sub-regions by the cruciform stem parts.

6. The liquid crystal display of claim 5, wherein
the fine branch parts extend in a different direction in each of the sub-regions.

7. The liquid crystal display of claim 4, wherein
neighboring fine branch parts are orthogonal to each other.

8. The liquid crystal display of claim 4, wherein
a width of the fine branch part is about 2.5 μm to about 5.0 μm.

* * * * *